(12) United States Patent
Muramatsu et al.

(10) Patent No.: US 12,428,073 B2
(45) Date of Patent: Sep. 30, 2025

(54) FLOOR STRUCTURE OF VEHICLE BODY

(71) Applicant: HONDA MOTOR CO., LTD., Tokyo (JP)

(72) Inventors: Yuki Muramatsu, Tokyo (JP); Kota Fujisawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 426 days.

(21) Appl. No.: 18/192,145

(22) Filed: Mar. 29, 2023

(65) Prior Publication Data

US 2023/0312016 A1 Oct. 5, 2023

(30) Foreign Application Priority Data

Mar. 31, 2022 (JP) .................... 2022-059165

(51) Int. Cl.
B62D 25/20 (2006.01)
(52) U.S. Cl.
CPC .................... B62D 25/20 (2013.01)
(58) Field of Classification Search
CPC ....................................................... B62D 25/20
See application file for complete search history.

(56) References Cited

U.S. PATENT DOCUMENTS

| 8,128,154 | B2 * | 3/2012 | Egawa | B62D 25/2036 |
| | | | | 296/193.07 |
| 9,902,436 | B2 * | 2/2018 | Muramatsu | B62D 25/2036 |
| 2005/0046236 | A1 * | 3/2005 | Nakamura | B62D 25/2036 |
| | | | | 296/193.07 |

FOREIGN PATENT DOCUMENTS

| JP | 2008265538 A | * | 11/2008 |
| JP | 2012-121471 A | | 6/2012 |

* cited by examiner

*Primary Examiner* — Lori Lyjak
(74) *Attorney, Agent, or Firm* — Rankin, Hill & Clark LLP

(57) ABSTRACT

A floor structure of vehicle body capable of appropriately preventing distortion and deformation of a floor is provided. The floor structure of vehicle body includes a lower wall and a body part as a floor section spanned between a pair of side sills lined up in the vehicle width directions; an upper wall and side walls as a tunnel section extending in the front/rear directions at a middle in the vehicle width directions of the floor section and having a upward convex shape, wherein a plurality of first ridges are formed on the floor section and the plurality of first ridges extend in the vehicle width directions from a boundary between the floor section and the tunnel section and inclines frontward as they go outward in the vehicle width directions.

7 Claims, 4 Drawing Sheets

FLOOR STRUCTURE OF VEHICLE BODY

CROSS REFERENCE TO RELATED APPLICATIONS

The present application relates to and claims priority from Japanese patent application No. 2022-059165, filed on Mar. 31, 2022. The entirety of the contents and subject matter of all of the above related application is incorporated herein by reference.

TECHNICAL FIELD

The present invention relates to a floor structure of a vehicle body.

BACKGROUND ART

As a floor structure of a vehicle, PTL (Patent Literature) 1 describes a structure in which an arc-shaped bead is assigned near a corner where a side member and a cross member intersect. The bead has a shape that extends in right/left directions of a vehicle body to efficiently disperse an impact load on a collision of the vehicle to avoid stress concentration.

CITATION LIST

Patent Literature

[PTL 1]
Japan Patent Publication No. 2012-121471

SUMMARY OF INVENTION

Technical Problem

Although a vehicle floor is sometimes subjected to a torsional load, a bead described in PTL 1 is not able to sufficiently suppress distortion and deformation (e.g., rupture) of the floor due to such a torsional load.

The present invention has been made in view of the aforementioned problems, and it is an object of the present invention to provide a floor structure of a vehicle body that allows an appropriately preventing distortion and deformation of a floor section.

Solution to Problem

In order to solve the above problem, the floor structure of the vehicle body provided by the present invention includes: a floor section that is spanned between a pair of side sills lined up in the vehicle width directions; and a tunnel section that extends in front/rear directions at a middle of the floor section in the vehicle width directions and has an upward convex shape, wherein the floor section includes a plurality of first ridges extending from a boundary with the tunnel section in the vehicle width directions, and the plurality of the first ridges are inclined frontward as they go outward in the vehicle width directions.

DESCRIPTION OF EMBODIMENTS

Figure 1:
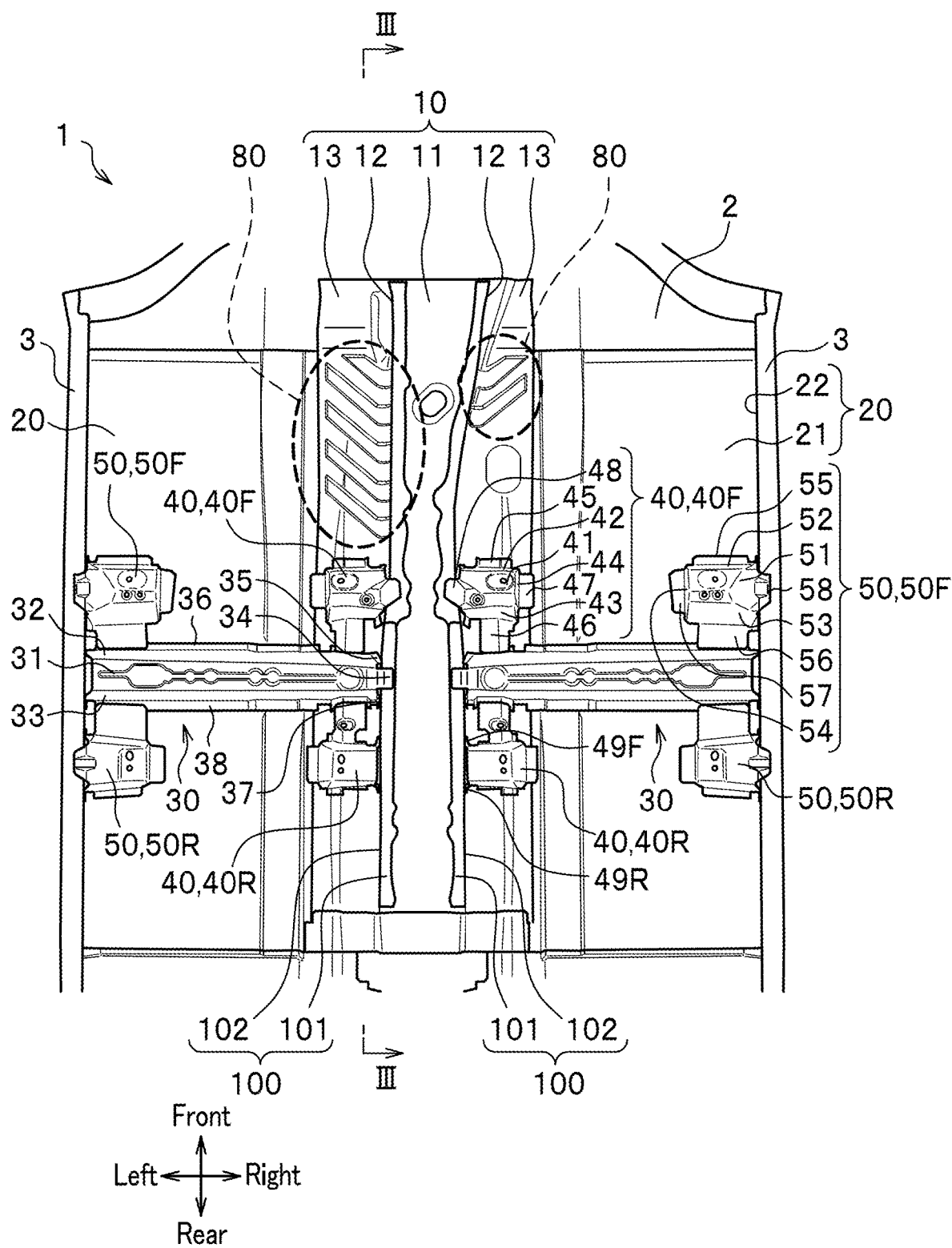
FIG. 1 is a schematic plan view of a floor structure of a vehicle body according to an embodiment of the present invention.

Next, the embodiment of the present invention is described in detail referring to the drawings as appropriate. In the referenced drawings, a term "front/rear" indicates front/rear directions of a vehicle, a term "right/left" indicates right/left directions (vehicle width directions) as viewed from a driver's seat, and a term "up/down" indicates up/down directions when the vehicle is located on a horizontal plane.

As shown in FIG. 1, the floor structure of vehicle body 1 of the embodiment of the present invention constitutes a main part of a floor of the vehicle body (particularly, vehicle compartment) at rearward of a dashboard 2 and between a pair of side sills 3 lined up in the vehicle width directions.

<Dashboard>

The dashboard 2 is a plate-shaped metal member that partitions a power compartment that is structured frontward of the dashboard 2 and a vehicle compartment that is structured rearward of the dashboard 2.

<Side Sill>

The side sill 3 is a closed cross-sectional metal member extending in the front/back directions at a lower part of a vehicle body and at ends in the vehicle width directions in the vehicle compartment. The side sills 3 each is structured, for example, by combining a side sill inner that constitutes an interior in the vehicle width directions of the side sill 3 and a side sill outer that constitutes an exterior in the vehicle width directions of the side sill 3. FIG. 1 depicts only the side sill inner of the side sill 3.

Figure 2:
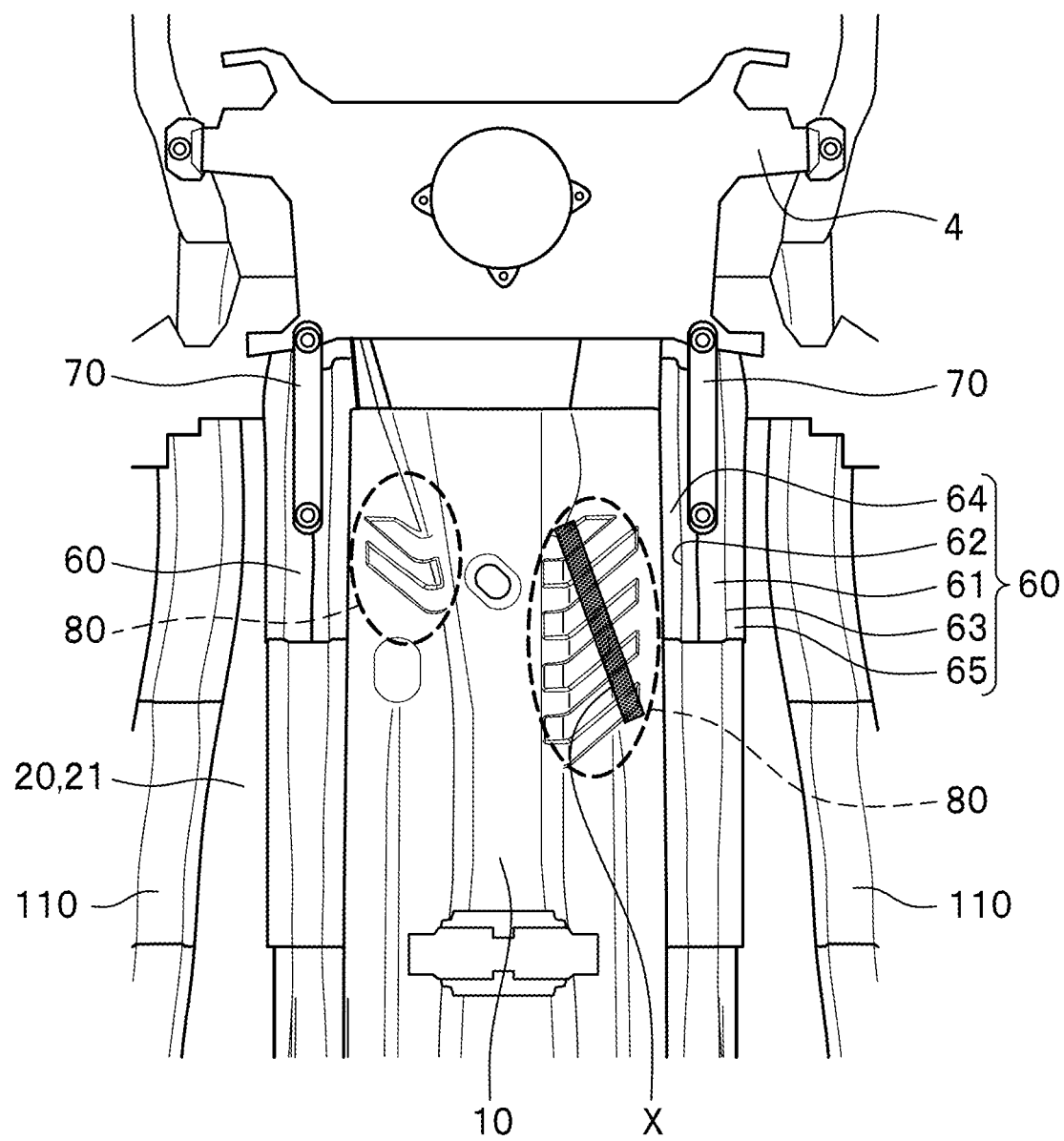
FIG. 2 is a schematic bottom view of the floor structure of the vehicle body according to the embodiment of the present invention.

The floor structure of vehicle body 1 includes a tunnel member 10 and a pair of floor members 20 lined up in the vehicle width directions as main members constituting a floor surface of the vehicle compartment. Further, the floor structure of vehicle body 1 includes a floor cross member 30 and a plurality of seat brackets 40 and 50 as main members provided above the floor surface of the vehicle compartment. Furthermore, as shown in FIG. 2, the floor structure of vehicle body 1 includes a pair of floor frames 60 lined up in the vehicle width directions as main members provided under the floor surface of the vehicle compartment.

<Tunnel Member>

As shown in FIG. 1, the tunnel member 10 is a metal member that is substantially hat-shaped and forms a mid-section in the vehicle width directions on the floor of the vehicle compartment. A front end of the tunnel member 10 overlaps a lower end of the dashboard 2 and is joined thereto by welding or the like. The tunnel member 10 is integrally provided with an upper wall 11, a pair of side walls 12 extending downward from ends in the vehicle width directions of the upper wall 11, and a pair of lower walls 13 extending outward in the vehicle width directions from ends of the side walls 12.

The upper wall 11 and the pair of side walls 12 form a tunnel section that extends in the middle in the width directions on the floor section to exhibit an upward convex shape. The lower wall 13 forms a part of the floor section that is spanned between a pair of side sills 3 lined up in the vehicle width directions. A vertical height of the tunnel section (upper wall 11) relative to the floor section (lower wall 13) is configured to become lower in a rearward direction (see arrows H1, H2, H3 in FIG. 3).

The tunnel member 10 includes a bead 80, which is described in detail below.

In the present embodiment, corners formed at boundaries of the upper wall 11 and the side walls 12 of the tunnel member 10 are reinforced by reinforcement members 100, which are L-shaped metal members extending in the front-back directions. The reinforcement member 100 includes integrally an upper wall 101 and a lower wall 102 extending downward from an outer edge in the vehicle width directions of the upper wall 101. The upper wall 101 overlaps from above on an end in the vehicle-width directions of the upper wall 11 of the tunnel member 10 and is joined thereto by welding or the like. The lower wall 102 overlaps an upper end of the side wall 12 of the tunnel member 10 from outside in the vehicle width directions and is joined thereto by welding or the like.

<Floor Member>

The floor member 20 is a plate-shaped metal member that forms a floor surface of the vehicle compartment between the tunnel member 10 and the side sill 3. The floor member 20 includes a body part 21 and a flange part 22 extending upward from an outer end in the vehicle width directions of the body part 21.

The body part 21 forms a main part of the floor section that is spanned between the pair of side sills 3 lined up in the vehicle width directions. A front end of the body part 21 overlaps a lower end of the dashboard 2 and is joined thereto by welding or the like. The flange part 22 overlaps an inner side in the vehicle width directions of the side sill 3 from an inside in the vehicle width directions and is joined thereto by welding or the like.

<Floor Cross Member>

A floor cross member 30 is a generally hat-shaped metal member extending outward in the vehicle width directions from the side wall 12 of the tunnel member 10, and cooperates with the lower wall 13 of the tunnel member 10 and the body part 21 of the floor member 20 to form a closed cross section extending in the vehicle width directions. An inner end in the vehicle width directions of the floor cross member 30 is joined to the side wall 12 and the upper wall 11 of the tunnel member 10 by welding or the like. An outer end in the vehicle width directions of the floor cross member 30 is located near an inner wall of the side sill 3 and is connected directly or indirectly thereto. The floor cross member 30 transfers a side impact load inputted through the side sill 3 to the tunnel section on a vehicle side collision.

The floor cross member 30 integrally includes an upper wall 31; a front wall 32 extending downward from a front end of the upper wall 31; and a rear wall 33 extending downward from a rear end of the upper wall 31. Further, the floor cross member 30 integrally includes a flange 34 extending inwardly in the vehicle width directions from an inner end in the vehicle width directions of the upper wall 31; a flange 35 extending forward from an inner end in the vehicle width directions of the front wall 32; and a flange 36 extending forward from a lower end of the front wall 32. Furthermore, the floor cross member 30 also integrally includes a flange 37 extending rearward from an inner end in the vehicle width directions of the rear wall 33; and a flange 38 extending rearward from a lower end of the rear wall 33.

The flange 34 is joined to the upper wall 11 of the tunnel member 10 from above by welding or the like. The flanges 35 and 37 are joined to the side wall 12 of the tunnel member 10 from outward in the vehicle width directions by welding or the like. The flanges 36 and 38 are joined to the lower wall 13 of the tunnel member 10 from outward in the vehicle width directions by welding or the like.

<Sheet Bracket>

A seat bracket 40 is a metal member to which a seat in the compartment is fixed. In the present embodiment, a pair of front and rear seat brackets 40F and 40R are provided for one seat (driver's or passenger's seat). The front seat bracket 40F is provided frontward of the inner end in the vehicle width directions of the floor cross member 30. The rear seat bracket 40R is provided rearward of the inner end in the vehicle width directions of the floor cross member 30.

The seat bracket 40 integrally includes an upper wall 41 to which a seat is fixed; a front wall 42 extending downward from a front end of the upper wall 41; a rear wall 43 extending downward from a rear end of the upper wall 41; and an outer wall 44 extending downward from an outer end in the vehicle width directions of the upper wall 41. Further, the seat bracket 40 integrally includes a flange 45 extending forward from an lower end of the front wall 42; a flange 46 extending rearward from a lower end of the rear wall 43; and a flange 47 extending outward in the vehicle width directions from the lower end of the outer wall 44.

The front seat bracket 40F integrally includes a flange 48 extending inward in the vehicle width directions from an inner end in the vehicle width directions of the upper wall 41. The rear seat bracket 40R integrally includes a flange 49F extending forward from an inner end in the vehicle width directions of the front wall 42 and a flange 49R extending rearward from an inner end in the vehicle width directions of the rear wall 43.

The flanges 45, 46, and 47 are overlaid from above on the lower wall 13 of the tunnel member 10 and are joined to the lower wall 13 by welding or the like. A rear end of the flange 46 of the front seat bracket 40F is overlaid from above on the flange 36 of the floor cross member 30 and is joined to the flange 36 by welding or the like. A front end of the flange 45 of the rear seat bracket 40R is overlaid from above on the flange 38 of the floor cross member 30 and is joined thereto by welding or the like. The flange 48 is overlaid from above on an upper wall 11 of the tunnel member 10 and is joined to the upper wall 11 by welding or the like. The flanges 49F and 49R are overlaid on the side wall 12 of the tunnel member 10 from outside in the vehicle width directions and are joined thereto by welding or the like.

<Sheet Bracket>

A seat bracket 50 is a metal member to which a seat in the compartment is fixed. In the present embodiment, a pair of front and rear seat brackets 50F and 50R are provided for one seat (driver's or passenger's seat). The front seat bracket 50F is provided frontward of the outer end in the vehicle width directions of the floor cross member 30. The rear seat bracket 50R is provided rearward of the outer end in the vehicle width directions of the floor cross member 30.

The seat bracket 50 integrally includes an upper wall 51 to which a seat is fixed; a front wall 52 extending downward from a front end of the upper wall 51; a rear wall 53 extending downward from a rear end of the upper wall 51; and an outer wall 54 extending downward from an inner end in the vehicle width directions of the upper wall 51. Further, the seat bracket 50 is also integrally provided with a flange 55 extending forward from a lower end of the front wall 52; a flange 56 extending rearward from a lower end of the rear wall 53; and a flange 57 extending inward in the vehicle width directions from the lower end of the outer wall 54. The seat bracket 50 integrally includes a flange 58 extending inward in the vehicle width directions from an inner end in the vehicle width directions of the upper wall 51.

The flanges 55, 56, and 57 are overlaid from above on the body part 21 of the floor member 20 and are joined thereto by welding or the like. A rear end of the flange 56 of the front seat bracket 50F is overlaid from above on the flange 36 of the floor cross member 30 and is joined thereto by welding or the like. A front end of the flange 55 of the rear seat bracket 50R is overlaid from above on the flange 38 of the floor cross member 30 and is joined to the flange 38 by welding or the like. The flange 58 is overlaid from above on an upper wall of the side sill 3 and is joined to the upper wall by welding or the like.

<Floor Frame>
<Floor Member>

As shown in FIG. 2, the floor frame (first floor frame) 60 is a generally hat-shaped metal member that cooperates with the body part 21 of the floor member 20 to form a closed cross section extending in the front-back directions between the tunnel section and the side sill 3. The floor frame 60 integrally includes a lower wall 61; an inner wall 62 extending upward from an inner end in the vehicle width directions of the lower wall 61; and an outer wall 63 extending upward from an outer end in the vehicle width directions of the lower wall 61. Further, the floor frame 60 is also integrally provided with a flange 64 extending inward in the vehicle width directions from an inner end in the vehicle width directions of the inner wall 62; and a flange 65 extending outward in the vehicle width directions from an outer end in the vehicle width directions of the outer wall 63.

The flanges 64 and 65 are overlaid on the body part 21 of the floor member 20 from the bottom and are joined to the body part 21 by welding or the like.

Figure 3:
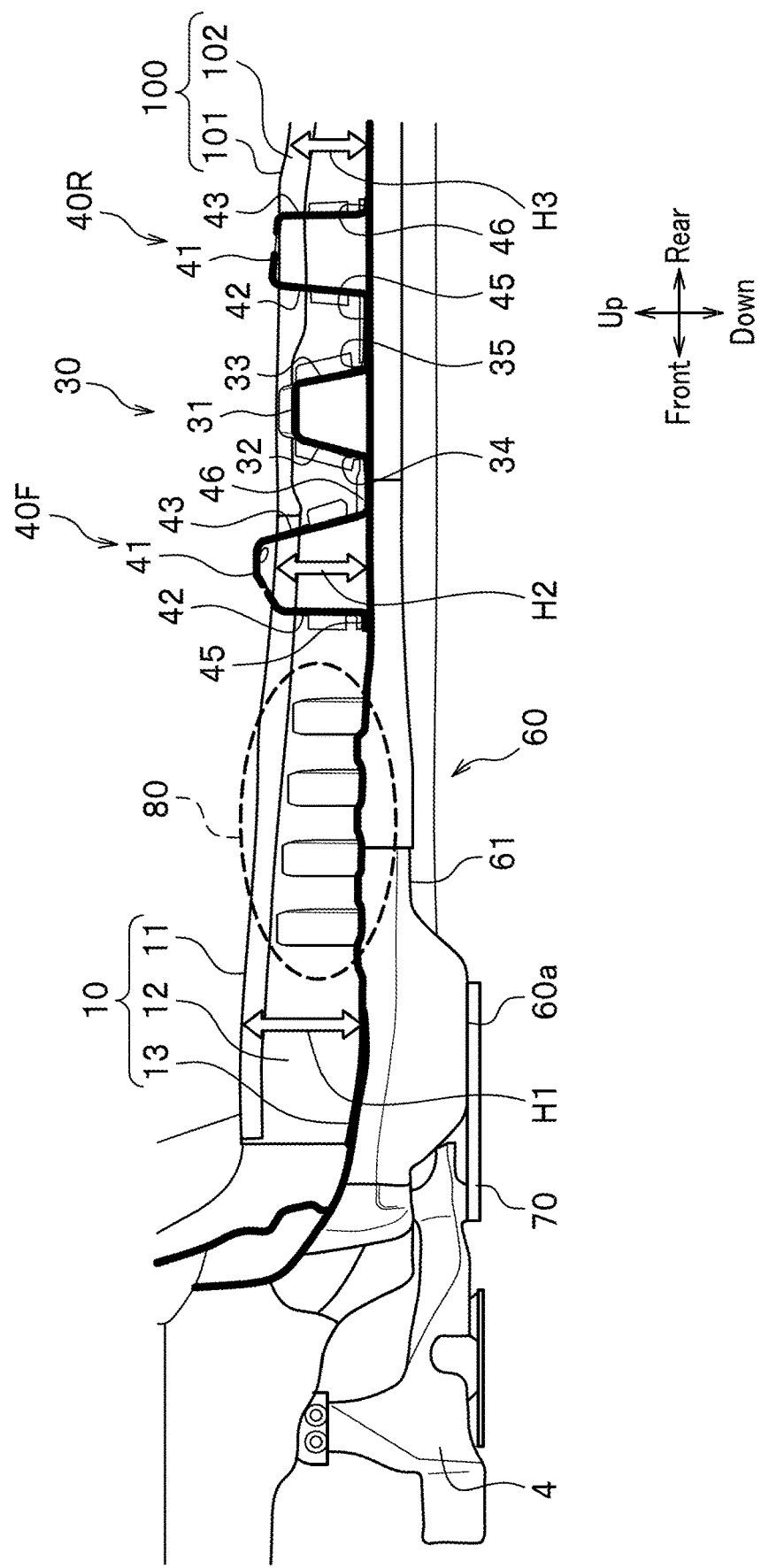
FIG. 3 is a cross sectional view along a III-III line of FIG. 1.

FIG. 3 shows a connecting portion 60a, to which a sub-frame 4 is connected, at a front end of the floor frame 60. The connecting portion 60a exhibits a shape in which the lower wall 61 bulges downward. A vertical position of the connecting portion 60a is configured to be the same height as a vertical position of a rear end of the sub-frame 4.

In the present embodiment, another floor frame (second floor frame) 110 is provided between the floor frame 60 and the side sill 3. Like the floor frame 60, the floor frame 110 is a substantially hat-shaped metal member that cooperates with the body part 21 of the floor member 20 to form a closed cross sectional surface extending in the front-back directions.

<Sub-Frame>

The sub-frame 4 is a metal framework member that is located forward of the tunnel section and to which an engine as a vehicle's power source, motor, and wheel (front wheel) suspension are attached in a power compartment configured in front of the dashboard 2.

<Extension Member>

In the present embodiment, the sub-frame 4 and floor frame 60 are connected to each other by an extension member 70. The extension member 70 is a metal plate member extending in the front-back directions. A front end of the extension member 70 is overlapped from below onto a rear end of the sub-frame 4 and is fixed to the rear end of the sub-frame 4 from below by bolting or other means. A rear end of the extension member 70 is overlapped from below onto the connecting portion 60a of the floor frame 60 and fixed to the connecting portion 60a by bolting or the like.

<Bead (First and Second Ridge)>

Figure 4:
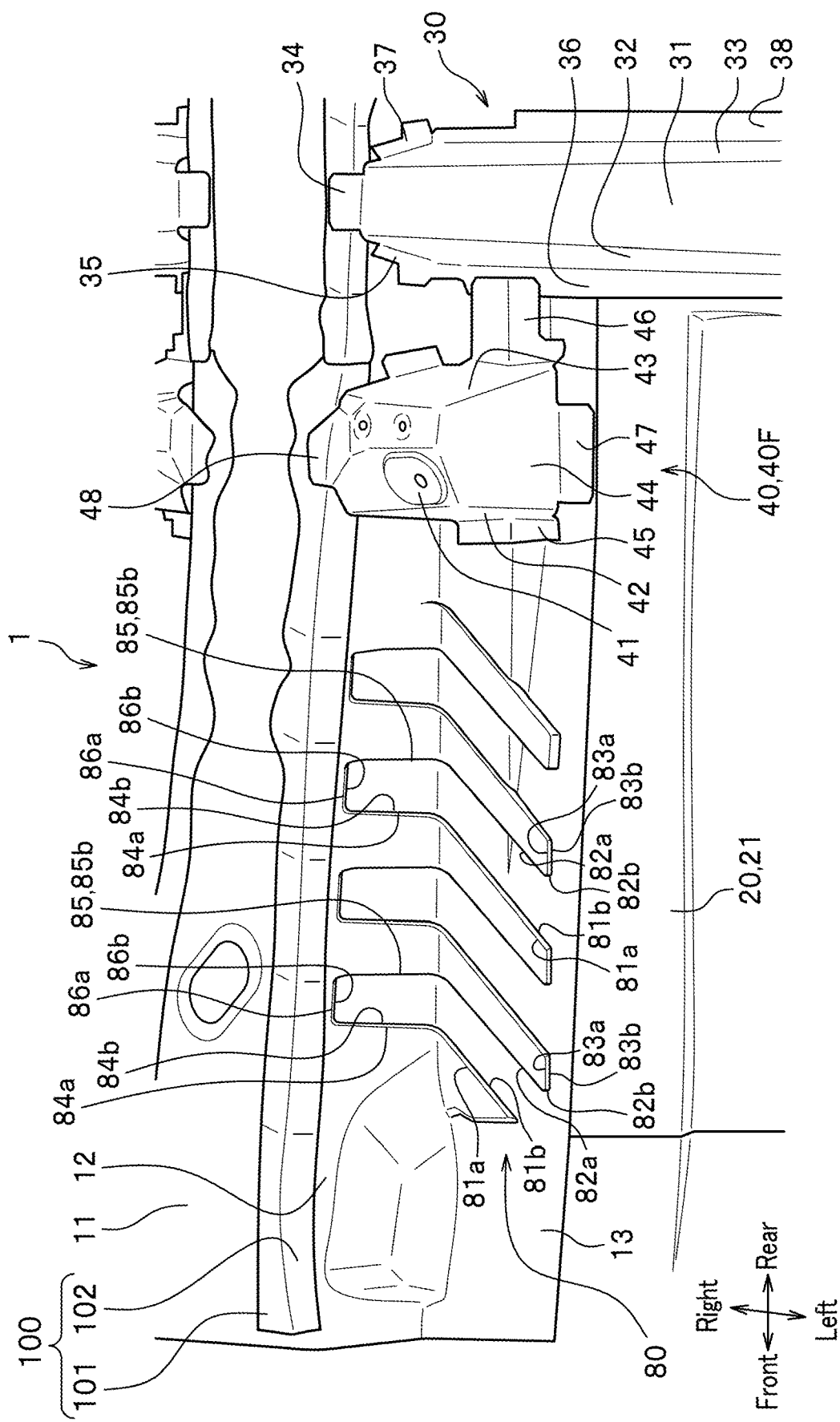
FIG. 4 is a partial enlarged perspective view schematically showing a first and second ridges in the floor structure of the vehicle body according to the embodiment of the present invention.

As shown in FIG. 4, the tunnel member 10 includes a bead 80. The bead 80 is formed between the side wall 12 and the lower wall 13. The bead 80 is formed inner ward than the sub-frame 60 (in detail, the connecting portion 60a) in the vehicle width directions. Further, the bead 80 is formed rearward of the connecting portion 60a and forward of the floor cross member 30 in the front-rear directions.

The bead 80 includes on the lower wall 13 an odd-ordered set of first ridges 81a and 81b counted from the frontward and an even-ordered set of first ridges 82a and 82b counted from the frontward as a plurality of first ridges arranged in the front-back directions. The bead 80 is further provided with front-rear directed ridges 83a and 83b.

The odd-ordered set of first ridges 81a and 81b extend from a boundary with the side wall 12 outward in the vehicle width directions and are inclined frontward as they go outward in the vehicle width directions. The even-ordered set of first ridges 82a and 82b extend outward in the vehicle width directions from the boundary with the side wall 12 and are inclined frontward as they go outward in the vehicle width directions. The first ridges 81a, 81b, 82a, and 82b extend in directions intersecting (preferably orthogonal to) a distortion caused by a torsional load inputted to the floor section through the connecting portion 60a from the sub-frame 4 (see a bold line indicated by "X" in FIG. 2) due to steering, thrust by damper, and the like.

The front-rear directed ridges 83a and 83b connect an outer edge in the vehicle width directions of the first ridges 82a and 82b and an outer edge in the vehicle width directions of the first ridges 81a and 81b on the rearward of the first ridges 82a and 82b. In the present embodiment, a space between the upper first ridge 81a and the upper first ridge 82a located rearward of the upper first ridge 81a forms a downwardly depressed recess, and a space between the lower first ridge 81b and the lower first ridge 82b located rearward of the lower first ridge 81b forms an upwardly protruding convex.

The bead 80 includes on the side wall 12 an odd-ordered set of second ridges 84a and 84b counted from the frontward and an even-ordered set of second ridges 85a and 85b counted from the frontward as a plurality of second ridges arranged in the front-back directions. The bead 80 is further provided with front-rear directed ridges 86a and 86b.

The odd-ordered set of second ridges 84a and 84b extend upward from a boundary with the lower wall 13. A lower end of the second ridge 84a, which is positioned outward in the vehicle width directions, is connected to an inner end in the vehicle width directions of the first ridge 81a. A lower end of the second ridge 84b, which is positioned inward in the vehicle width directions, is connected to an inner end in the vehicle width directions of the first ridge 81b. The even-ordered set of the second ridges 85a and 85b extend upward from the boundary with the lower wall 13. A lower end of the second ridge 85a, which is positioned outward in the vehicle width directions, is connected to an inner end in the vehicle width directions of the first ridge 82a. A lower end of the second ridge 85b, which is positioned inward in the vehicle width directions, is connected to an inner end in the vehicle width directions of the first ridge 82b.

The front-rear directed ridges 86a and 86b connect an outer edge in the vehicle width directions of the second ridges 84a and 84b to an outer edge in the vehicle width directions of the second ridges 85a and 85b positioned on the rearward of the second ridges 84a and 84b. In the present embodiment, a space between the second ridge 83a positioned outward in the vehicle width directions and the second ridge 84a positioned outward in the vehicle width directions and positioned rearward of the second ridge 83a forms a recess depressed inward in the vehicle width directions, and a space between the lower second ridge 83b positioned inward in the vehicle width directions and the second ridge 84b positioned inward in the vehicle width directions and positioned rearward of the second ridge 83b forms a convex protruding outward in the vehicle width directions.

In the floor section of a vehicle compartment, for example, stress inputted from the sub-frame 4 may concentrate near the tunnel section. Such stresses may act to twist the floor section in the vicinity of the tunnel section (load in the torsional direction) to cause distortion and deformation (e.g., rupture) of the floor section.

In contrast, the floor structure of vehicle body 1 of the embodiment of the present invention includes the floor section (lower wall 13 and body part 21) that is spanned between the pair of side sills 3 lined up in the vehicle width directions, and the tunnel section (upper wall 11 and side walls 12) that extends in the front-back directions in the middle in the vehicle width directions of the floor section and has an upward convex shape, wherein the floor section has a plurality of the first ridges 81a, 81b, 82a, and 82b that extend in the vehicle width directions from the boundary with the tunnel section, and the plurality of the first ridges 81a, 81b, 82a, and 82b are inclined toward the front as it goes outward in the vehicle width directions.

Therefore, because the first ridges 81a, 81b, 82a, and 82b extend in a direction that intersects (preferably orthogonal to) a direction of distortion of the floor section (see bold line indicated by X in FIG. 2), the floor structure of vehicle body 1 is able to distribute a stress (torsional load) concentrated near the tunnel section to the first ridges 81a, 81b, 82a, and 82b and thereby to improve rigidity against the stress and to appropriately prevent distortion and deformation (rupture, etc.) of the floor section.

In the floor structure of vehicle body 1, the tunnel section includes the pair of side walls 12 lined up in the vehicle width directions that extend upward from the floor section, and an upper wall 11 connecting the upper ends of the pair of side walls 12 with each other, wherein the side walls 12 have the plurality of second ridges 84a, 84b, 85a, and 85b formed, which second ridges 84a, 84b, 85a, and 85b connect to the first ridges 81a, 81b, 82a, and 82b and extend in the up and down directions.

Therefore, the floor structure of vehicle body 1 is able to transfer a stress acting on the first ridges 81a, 81b, 82a, and 82b to the second ridges 84a, 84b, 85a, and 85b that are continuous with the first ridges 81a, 81b, 82a, and 82b to distribute the stress toward the side walls 12, which allows more suitably prevent the distortion and deformation of the floor section In the floor structure of vehicle body 1, the plurality of the first ridges 81a, 81b, 82a, and 82b and the plurality of the second ridges 84a, 84b, 85a, and 85b are formed by the beads 80 spanning the floor and the tunnel sections.

Therefore, the floor structure of vehicle body 1 allows simple process to form the first ridges 81a, 81b, 82a, and 82b and the second ridges 84a, 84b, 85a, and 85b that are continuous, and the stress concentrated in the vicinity of the tunnel section to be more suitably dispersed because a pair of the first ridges 81a and 81b and the second ridges 84a and 84b (and the first ridges 82a and 82b and the second ridges 85a and 85b) formed by the bead 80 are provided in close proximity.

In the floor structure of vehicle body 1, the floor section is connected to a sub-frame 4 provided forward of the tunnel section, and the plurality of the first ridges 81a, 81b, 82a, and 82b and the plurality of the second ridges 84a, 84b, 85a, and 85b are assigned inner ward in the vehicle width directions than the connecting portion (connecting portion 60a) of the floor section and the sub-frame 4.

Therefore, the floor structure of vehicle body 1 is able to transfer a stress generated by a load inputted from the sub-frame 4 through the connecting portion to the floor section to the second ridges 84a, 84b, 85a, and 85b that are continuous with the first ridges 81a, 81b, 82a, and 82b to distribute the stress to the side wall 12, and thereby suitably preventing distortion and deformation of the floor section.

The vehicle floor structure 1 includes the floor frame 60 extending in the front-rear directions between the tunnel section and the side sill 3 in the floor section; the sub-frame 4 is connected to the floor frame 60 via an extension member 70; and the plurality of the first ridges 81a, 81b, 82a, and 82b and the plurality of the second ridges 84a, 84b, 85a, and 85b are located inner ward in the vehicle width directions than the connecting portion (connecting portion 60a) of the floor frame 60 with the extension member 70.

Therefore, the floor structure of vehicle body 1 is able to distribute the stress acting between the floor frame 60 and the tunnel section and further transfer and distribute the stress to the side wall section 12, which allows more suitably preventing distortion and deformation of the floor section.

In the floor structure of vehicle body 1, the vertical height of the tunnel section from the floor section is configured to decrease rear ward.

Therefore, the floor structure of vehicle body 1 allows the bead 80 to reduce a circumferential length difference, wrinkles, and distortion of the tunnel section that may occur during a manufacturing process, and uneven stiffness of a floor surface of the vehicle body (panel and tunnel sections).

The floor structure of vehicle body 1 includes the floor cross member 30 extending outward in the vehicle width directions from the tunnel, and the plurality of the first ridges 81a, 81b, 82a, and 82b and the plurality of the second ridges 84a, 84b, 85a, and 85b are installed forward of the floor cross member 30.

Therefore, the floor structure of vehicle body 1 can suitably respond to distortion and deformation due to twisting of the panel section and the side impact load.

Although the embodiment of the present invention is described above, the invention is not limited to the aforementioned embodiment and can be modified as appropriate to the extent without departing from the gist of the invention. For example, the number, the arrangement angle, the arrangement interval, and the like of the first ridges 81a, 81b, 82a, and 82b can be set appropriately according to a type of vehicle.

REFERENCE SIGNS LIST

1: Body panel structure
3: Side sill
4: Sub-frame
10: Tunnel member
11: Upper wall (tunnel section)
12: Side wall (tunnel section)
13: Lower wall section (floor section)
20: Floor member
21: Body (floor section)
30: Floor cross member
60: Floor frame 70: Extension member
80: Bead
81*a*, 81*b*, 82*a*, and 82*b*: First ridge
84*a*, 84*b*, 85*a*, and 85*b*: Second ridge

The invention claimed is:

1. A floor structure of vehicle body, comprising:
a floor section that is spanned between a pair of side sills lined up in vehicle width directions; and
a tunnel section that extends in front/rear directions at a middle in the vehicle width directions of the floor section and has an upward convex shape,
wherein
the floor section includes a plurality of first ridges extending from a boundary with the tunnel section in the vehicle width directions; and
the plurality of the first ridges are inclined frontward as they go outward in the vehicle width directions.

2. The floor structure of vehicle body according to claim 1,
wherein
the tunnel section includes:
a pair of side walls lined up in the vehicle width directions that extends upward from the floor section; and
an upper wall connecting upper ends of the pair of side walls with each other, and
wherein
the pair of side walls each has a plurality of second ridges connecting to the first ridges and extending in the vertical directions.

3. The floor structure of vehicle body according to claim 2,
wherein
the plurality of the first ridges and the plurality of the second ridges are formed by beads spanning the floor and tunnel sections.

4. The floor structure of vehicle body according to claim 2,
wherein
the floor section is connected to a sub-frame provided forward of the tunnel section; and
the plurality of the first ridges and the plurality of the second ridges are located inner ward in the vehicle width directions than a connecting portion of the floor section and the sub-frame.

5. The floor structure of vehicle body according to claim 4,
comprising a floor frame extending in the front/rear directions between the tunnel section and the side sills in the floor section,
wherein
the sub-frame is connected to the floor frame via an extension member;
the plurality of the first ridges and the plurality of the second ridges are located inner ward in the vehicle width directions than a connecting portion of the floor frame and the extension member.

6. The floor structure of vehicle body according to claim 3,
wherein
a vertical height of the tunnel section from the floor section is configured to decrease in a rearward direction.

7. The floor structure of vehicle body according to claim 3,
comprising a floor cross member extending outward in the vehicle width directions from the tunnel section,
wherein
the plurality of the first ridges and the plurality of the second ridges are provided frontward of the floor cross member.

* * * * *